Jan. 4, 1966   J. A. SHOOK   3,227,102
FREIGHT BRACING APPARATUS
Filed April 12, 1962   2 Sheets-Sheet 1
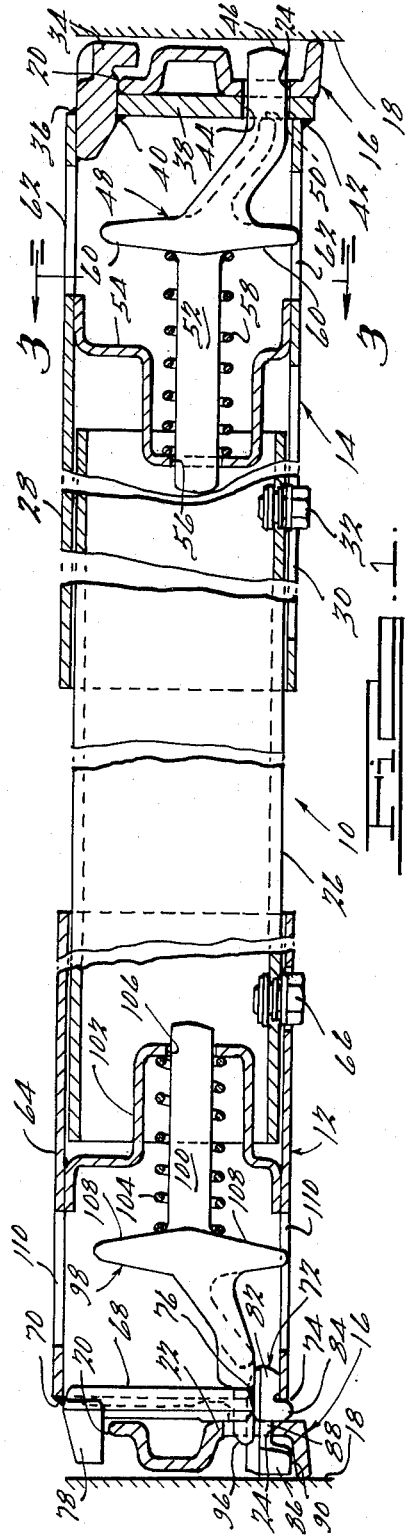
INVENTOR.
Jackson A. Shook
BY
Carnes, Dickey & Pierce
ATTORNEYS.

Jan. 4, 1966  J. A. SHOOK  3,227,102
FREIGHT BRACING APPARATUS
Filed April 12, 1962  2 Sheets-Sheet 2
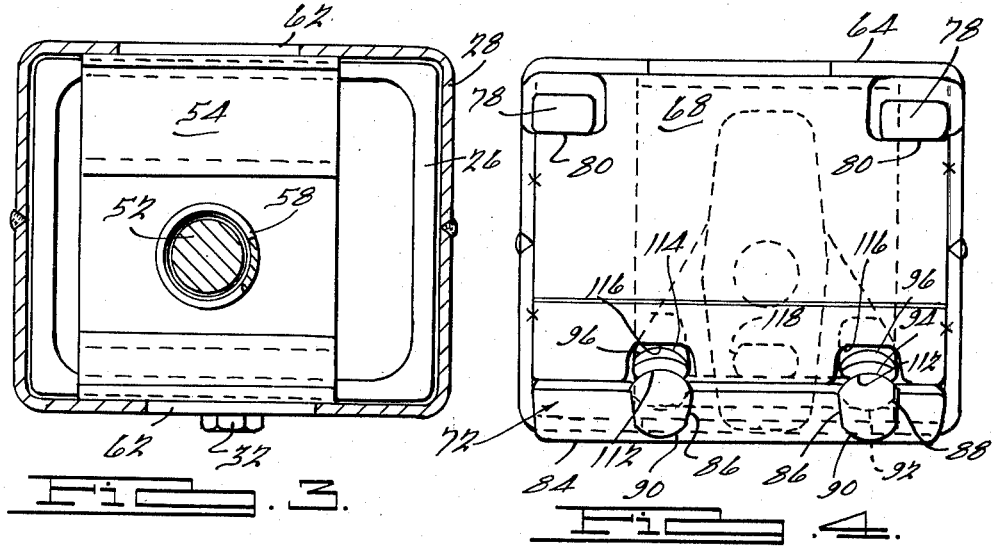
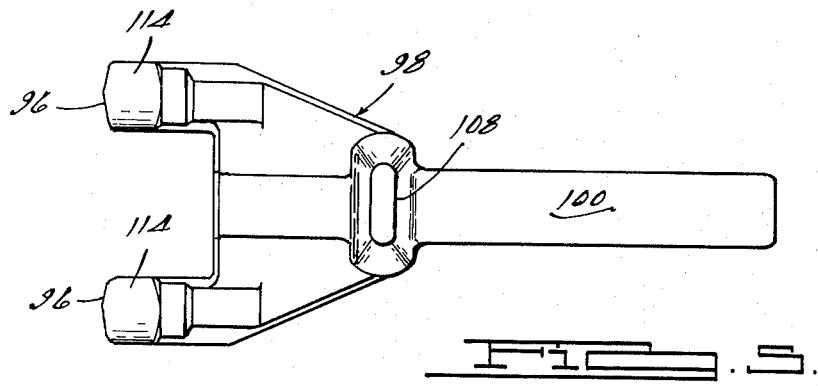
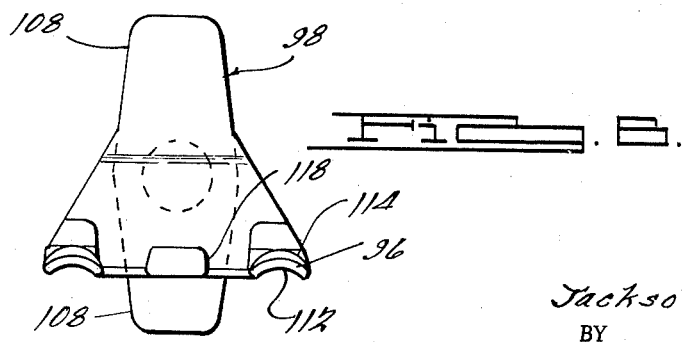
INVENTOR.
Jackson A. Shook
BY
Harness, Dickey & Pierce
ATTORNEYS

United States Patent Office 3,227,102
Patented Jan. 4, 1966

3,227,102
FREIGHT BRACING APPARATUS
Jackson A. Shook, Northville, Mich., assignor to Evans Products Company, Plymouth, Mich., a corporation of Delaware
Filed Apr. 12, 1962, Ser. No. 187,014
9 Claims. (Cl. 105—369)

The present invention relates to freight bracing apparatus and more particularly, to improved freight bracing apparatus of the type adapted for use in railway boxcars, trucks, warehouses, and the like for supporting and/or bracing general merchandise.

It is an object of the present invention to provide improved freight bracing apparatus adapted for such use which is of the type adapted for what is known as "one man operation," that is, the freight bracing apparatus includes a crossbar adapted to be supported at its opposite ends on supporting members commonly known as belt rails and is so constructed that at least one end of the crossbar may be connected to and disconnected from its associated belt rail by an operator without the necessity of the operator being at that end of the crosbar.

It is also an object of the present invention to provide an improved crossbar adapted for use with conventional belt rail members having horizontally opening apertures and including an end fitting at at least one end thereof, having hook portions adapted to co-operate with said apertures and including latch portions adapted to be received in the same apertures with said hook portions to prevent sufficient vertical movement of the end fittting relative to the belt rail to permit withdrawal of the hook portions from the apertures while permitting pivotal movement of the bar and end fitting relative to the belt rail to move the latch portions into and out of the apertures.

It is also an object of the present invention to provide an improved end fitting for a freight bracing crossbar of the type adapted for one man operation, which end fitting includes hook means adapted to co-operate with a belt rail having horizontally opening apertures and which end fitting includes latch portions adapted to be received in the same apertures with the hook means and adapted to be automatically moved into and out of said apertures upon pivotal movement of the end fitting relative to the belt rail to and from a position in which the end fitting extends generally at right angles to the belt rail.

It is also an object of the present invention to provide such an end fitting in which the latch portions are movable relative to the hook means and yieldably urged to an operative position in which they extend into said apertures when said hook means are engaged in said apertures.

It is also an object of the present invention to provide an improved freight bracing apparatus of the above mentioned type which is simple in design, economical of manufacture, of rugged construction and reliable and efficient in operation.

Other and more detailed objects of the present invention will be readily apparent to those skilled in the art from a consideration of the following specification, the appended claims and the accompanying drawings wherein:

FIGURE 1 is a broken longitudinal view of freight bracing apparatus constructed according to the present invention;

FIGURE 2 is an end elevational view looking at the right-hand end of the crossbar illustrated in FIGURE 1;

FIGURE 3 is a sectional view of the structure illustrated in FIGURE 1 taken substantially along the line 3—3 thereof;

FIGURE 4 is an end elevational view of the crossbar illustrated in FIGURE 1 taken from the left-hand end thereof;

FIGURE 5 is a top view of the latch element of the end fitting at the left-hand end of the crossbar illustrated in FIGURE 1; and FIGURE 6 is an end elevational view of the latch element illustrated in FIGURE 5 as seen from the left-hand end thereof.

Referring to the drawings, and particularly to FIGURE 1 thereof, the freight bracing apparatus of the present invention comprises a crossbar generally indicated at 10 having end fittings 12 and 14 at the left and right-hand ends thereof, respectively, which are adapted for attachment to belt rails 16 extending horizontally along and suitably supported on a supporting structure generally indicated by the broken line 18 which, it will be appreciated, may be the side wall of a railway boxcar, side wall of a truck or suitable associated supporting structure in a warehouse or the like. The belt rails 16 illustrated are of the construction shown and described in greater detail in the co-pending application of my former co-worker Henry L. Dunlap, now deceased, Serial No. 836,168, filed August 26, 1959, assigned to the assignee of the present application. For the present purposes it is sufficient to point out that the belt rail 16 has an upwardly presenting continuous edge portion 20 disposed in spaced relation to the wall or other supporting structure 18 and also has a web portion 22 extending in spaced parallel relation to the wall 18 and having a plurality of horizontally extending uniformly spaced circular apertures 24 therethrough.

The crossbar 10 in the preferred embodiment illustrated comprises an elongated tubular metal body portion 26 of rectangular cross section. At the right-hand end of the crossbar body 26, as viewed in FIGURE 1, the end fitting 14 is connected thereto for telescopic movement relative thereto longitudinally of the bar body 26. For effecting this connection the end fitting 14 has a sleeve body 28 adapted to telescopically fit over the end of the crossbar body 26 and is provided with an elongated slot 30 shown at the bottom thereof. A bolt 32 is fastened in the lower wall of the crossbar body 26 with its head disposed in the elongated slot 30, thus permitting limited telescopic movement of the end fitting 14 determined by the length of the slot 30.

Briefly stated, the end fitting 14 comprises a hook forging 34 welded in the open end of the end fitting sleeve 14 at the upper side thereof as indicated at 36 and a face plate 38 welded to the hook forging 34 as indicated at 40 and extending downwardly therefrom across the outer end of the end fitting sleeve 28 and welded to the bottom side thereof as indicated at 42. The face plate 38 has a pair of apertures 44 therein adapted to receive a pair of pins 46 integrally formed on a latch element generally indicated at 48 disposed within the end fitting sleeve 28. The latch element 48 has a portion 50 intermediate the latch pins 46 adapted to abut the inner surface of the face plate 38 between the apertures 44 to limit movement of the latch element outwardly or to the right, as seen in FIGURE 1. The latch element 48 also includes a shank portion 52 extending longitudinally of the end fitting sleeve 28 and slidably supported in a latch guide and spring support cup 54 fitted in the end fitting sleeve 28 and spot welded thereto. The cup 54 has a central aperture 56 through which the shank 52 of the latch element extends. The shank 52 is surrounded by a spring 58, one end of which seats on the spring support cup 54 around the aperture 56 and the other end of which abuts against upwardly and downwardly extending finger portions 60 integrally formed on the latch element 48 which may be engaged by an operator through openings 62 provided at the top and bottom of the end fitting sleeve 28. When this end fitting is connected to the belt rail 16 the hook forging 34 hooks over the upper flange of the belt rail as shown with the hook forging 34 supported on the upwardly presenting edge 20 of the belt rail. The latch pins 46 extend through the apertures 44 in the face plate and through the apertures 24 in the belt rail to hold the end fitting against movement longitudinally of the belt rail. In the embodiment illustrated the lateral spacing of the pins 46 is double the spacing of the apertures 24 in the belt rail. The pins 46 also resist any force urging the end fitting 14 upwardly.

The end fitting 12 at the left-hand end of the crossbar 10, as viewed in FIGURE 1, also includes a sleeve body 64 similar to the sleeve body 28 of the end fitting 14 and which is received over the left-hand end of the crossbar body 26. In the preferred embodiment illustrated the sleeve body 64 is held in fixed relation to the crossbar body 26 by a bolt 66 extending through aligned openings in the sleeve 64 and the end portion of the crossbar body 26. The outer end of the sleeve body 64 of the end fitting 12 is closed by a face plate 68 welded to the upper side of the sleeve 64 as indicated at 70 and extending downwardly therefrom to a point adjacent the lower side of the sleeve body 64. The space between the lower edge of the face plate 68 and the lower side of the sleeve body 64 is closed by a hook forging 72 which is welded to the bottom side of the sleeve body 64 as indicated at 74 and is welded to the face plate 68 as indicated at 76. At its upper corners the face plate 68 is provided with a pair of integrally formed parallel projections 78 extending longitudinally of the sleeve body 64 and having horizontally disposed lower surfaces 80 adapted to overlie and engage the upwardly presenting edge 20 of the belt rail 16.

The hook forging 72 is generally angular in shape including a flange portion 82 extending inwardly of the sleeve body 64 and resting on the inner surface of the bottom side thereof and a downwardly extending flange 84 extending downwardly over the outer edge of the sleeve body 64 and welded thereto as indicated at 74. The hook forging 72 carries a pair of spaced hook portions 86 which in the preferred embodiment illustrated are also spaced at double the spacing of the apertures 24 in the belt rail and each of which includes a neck portion 88 extending longitudinally of the sleeve body 64 and a downwardly turned hook end 90. The lower surface indicated at 92 in FIGURE 4 of the neck portion 88 is arcuately shaped as there illustrated for engagement with the lower portion of one of the apertures 24 in the belt rail 16 when the end fitting 12 is attached to the belt rail 16.

The thickness of the neck portion 88 measured vertically is substantially less than the diameter of the belt rail apertures 24 and the upper surface thereof is arcuately shaped as indicated at 94 in FIGURE 4 to fit and slidably support the latch portions 96 of a latch element 98. This latch element 98 is generally similar to the latch element 48 in that it is disposed within the sleeve body 64 and provided with a shank 100 slidably supported in a cup 102 similar to the cup 54 and urged outwardly by a spring 104, one end of which engages the cup 102 around the aperture 106 therein through which the shank 100 slides, and the finger projections 108 which similarly may be engaged by an operator through apertures 110 provided in the top and bottom of the sleeve body 64. The latch element 98, however, differs from the latch element 48 in that, in place of the cylindrical pins 46 of the latch element 48, the latch element 98 is provided with arcuately shaped latch portions 96 which extend into the apertures 24 in the belt rail 16 above the neck portions 88 of the hooks 86. The lower surfaces of the latch portions 96, indicated at 112 in FIGURES 4 and 6, are arcuately shaped to provide a sliding fit with the upper surfaces 94 of the neck portions 88. The upper surfaces of the latch portions 96 are arcuately shaped as indicated at 114 in FIGURES 4 and 6 and are adapted, in the event of upward movement of the end fitting relative to the belt rail 16 when the end fitting is attached thereto, to engage the belt rail at the upper portions of the apertures 24 to prevent such upward movement as would be sufficient to permit the hook end 90 to be withdrawn through the aperture 24.

The face plate 68 at its lower edge is provided with a pair of spaced notches 116 aligned with the hooks 86 and adapted to receive the latch portions 96 therethrough. The latch element 98, intermediate the latch portions 96, is provided with a central boss 118 adapted to engage the inner surface of the face plate 68 intermediate the notches 116 to limit movement of the latch element to the left as illustrated in FIGURE 1 to assure that there is no excessive extension of the latch portions 96 beyond the inner surface of the web portion 22 of the belt rail 16 in which the apertures 24 are formed. The over-all thickness of the neck portions 88 and latch portions 96 is such that the neck portions 88 and latch portions 96 have a loose fit in the apertures 24 of the belt rail.

It will be appreciated that, if desired, the end fittings at both ends may be of the construction of the above-described end fitting 12 insofar as the structure for connection to the belt rail is concerned. However, at least one of the end fittings must have a connection to the bar body permitting limited telescopic relative movement therebetween. Where only one end fitting is of the construction of end fitting 12, preferably the other end fitting is mounted for telescopic movement relative to the bar body.

It will now be seen that in this construction, when the end fitting 12 is connected to the belt rail 16, as illustrated in FIGURE 1, the latch portion 96 will engage the belt rail at the upper portion of the hole 24 to prevent upward movement of the end fitting 12 relative to the belt rail 16 sufficiently to permit the hook end 90 to be withdrawn through the aperture 24. However, when the end fitting 14 is disconnected from the belt rail 16, the right-hand end of the crossbar 10 may be lowered causing the crossbar to pivot about the engagement of the neck portions 88 of the end fitting 12 at the left-hand end of the crossbar with the belt rail 16 in the lower portions of the apertures 24, and during this pivotal movement the latch portions 96 will be withdrawn from the apertures 24 permitting the end fitting 12 to be raised sufficiently relative to the belt rail 16 so that the hook ends 90 may be withdrawn through the apertures 24. During this operation it is not necessary for the operator to manually engage the latch element 98 and, similarly, the operation may be reversed without engaging the latch element 98 to effect connection of the end fitting 12 to the belt rail 16. It will be appreciated, of course, that when desired, and particularly in instances where the opposite end of the bar cannot be lowered to effect one man operation, the operator may engage the finger portions 108 of the latch element 98 through the openings 110 to withdraw the latch element 98 to the right as seen in FIGURE 1 to withdraw the latch portions 96 from the apertures 24, thereby permitting the end fitting 12 to be raised to withdraw the hook ends 90 through the apertures 24.

When the crossbar is in its position of use attached to the belt rails, the widely spaced projections 78 will engage the upwardly presenting edge 20 of the belt rail upon any tendency of the bar to rotate on its axis and will co-operate with the hooks 86 and latch portions 96 in limiting such movement.

While only one specific embodiment of the invention has been illustrated and described in detail herein, it will be readily appreciated by those skilled in the art that numerous modifications and changes may be made without departing from the spirit of the present invention.

What is claimed is:

1. An end fitting for a crossbar for bracing freight in boxcars and the like and adapted for connection to a belt rail mounted on a side wall thereof and extending longitudinally thereof and which belt rail includes an upwardly presenting surface portion and has a plurality of horizontally opening apertures spaced therealong, said end fitting comprising means on one end of said end fitting for connecting said end fitting to one end of a said crossbar, projection means on the other end of said end fitting adapted to extend longitudinally of said crossbar and in overlying relation to said upwardly presenting surface on said belt rail, hook means on said other end of said end fitting comprising at least one hook portion co-operable with at least one of said apertures and inculding a neck portion adapted to extend longitudinally of said crossbar and to be received in the lower portion of said one of said apertures and engage said belt rail at said lower portion of said one of said apertures, said hook portion also including a downwardly extending hook end outwardly of said neck portion adapted to be inserted through said one of said apertures and extend below said lower portion of said one of said apertures when said neck portion is received therein, said end fitting including a latch portion adapted to be disposed in the upper portion of said one of said apertures when said hook end has been inserted therethrough and said neck portion moved into said lower portion so that said latch portion will engage said belt rail at said upper portion of said one of said apertures to prevent sufficient upward movement of said end fitting to permit withdrawal of said hook end through said aperture by movement of said end fitting at right angles to said belt rail, said neck portion and said latch portion having a sufficiently loose fit in said one of said apertures so that upon lowering of said one end of said end fitting so that said end fitting pivots about the engagement of said neck portion with said belt rail at said lower portion of said one of said apertures said latch portion moves out of said aperture.

2. An end fitting for a crossbar for bracing freight in boxcars and the like and adapted for connection to a belt rail mounted on a side wall thereof and extending longitudinally thereof and which belt rail includes an upwardly presenting surface portion and has a plurality of horizontal opening apertures spaced therealong, said end fitting comprising means on one end of said end fitting for connecting said end fitting to one end of a said crossbar, projection means on the other end of said end fitting adapted to extend longitudinally of said crossbar and in overlying relation to said upwardly presenting surface on said belt rail, hook means on said other end of said end fitting comprising at least one hook portion co-operable with at least one of said apertures and including a neck portion adapted to extend longitudinally of said crossbar and to be received in the lower portion of said one of said apertures and engage said belt rail at said lower portion of said one of said apertures, said hook portion also including a downwardly extending hook end outwardly of said neck portion adapted to be inserted through said one of said apertures and extend below said lower portion of said one of said apertures when said neck portion is received therein, a latch element having a latch portion, means mounting said latch element on said end fitting for movement to and from an operative position in which said latch portion is adapted when said neck portion is in said lower portion of said one of said apertures to extend into the upper portion of said one of said apertures and engage said belt rail to prevent upward movement of said end fitting relative to said belt rail sufficiently to permit withdrawal of said hook end through said aperture, means yieldably urging said latch element to said operative position, said neck portion and said latch portion having a sufficiently loose fit in said one of said apertures so that upon lowering of said one end of said end fitting so that said end fitting pivots about the engagement of said neck portion with said belt rail at said lower portion of said one of said apertures said latch portion moves out of said aperture.

3. An end fitting for a crossbar for bracing freight in boxcars and the like and adapted for connection to a belt rail mounted on a side wall thereof and extending longitudinally thereof and which belt rail includes an upwardly presenting surface portion and a plurality of horizontally opening apertures spaced therealong, said end fitting comprising means on one end of said end fitting for connecting said end fitting to one end of a said crossbar, projection means on the other end of said end fitting adapted to extend longitudinally of said crossbar and in overlying relation to said upwardly presenting surface on said belt rail, a pair of hook portions on said other end of said end fitting co-operable with a pair of said apertures and each including a neck portion adapted to extend longitudinally of said crossbar and to be received in the lower portion of one of said pair of apertures and engage said belt rail at said lower portion of said one of said pair of apertures, each of said hook portions including a downwardly extending hook end outwardly of said neck portion adapted to be inserted through one of said pair of apertures and extending below said lower portion thereof when said neck portion is received therein, a latch element having a pair of latch portions adapted to be disposed in the upper portions of said pair of apertures when said hook ends have been inserted therethrough and said neck portions moved into said lower portions so that said latch potrions will engage said belt rail at said upper portions of said pair of apertures to prevent sufficient upward movement of said end fitting to permit withdrawal of said hook ends through said pair of apertures by movement of said end fitting at right angles to said belt rail, said neck portions and said latch portions having a sufficiently loose fit in said pair of apertures so that upon lowering of said one end of said end fitting said end fitting pivots about the engagement of said hook portions with said belt rail at said lower portions of said pair of apertures said latch portions move out of said pair of apertures, said hook portions, said latch portions and said projection means being adapted to engage said belt rail when said end fitting is attached thereto, to limit rotation of said end fitting relative to said belt rail about the longitudinal axis of said end fitting.

4. An end fitting as defined in claim 1 wherein said projection means includes means disposed adjacent opposite lateral sides of said end fitting.

5. An end fitting as defined in claim 3 wherein said projection means comprises a pair of projections disposed at the upper corners of said end fitting.

6. An end fitting as defined in claim 2 wherein said latch portion slidably engages said neck portion and the adjacent contacting surfaces of said latch portion and said neck portion are arcuately shaped for interfitting engagement and the outer surfaces of said neck portion and said latch portion are adapted to be loosely received within said one of said apertures and to engage said belt rail at said lower and upper portions, respectively, of said one of said apertures.

7. An end fitting for a crossbar for bracing freight in boxcars and the like and adapted for connection to a belt rail mounted on a side wall thereof and extending longitudinally thereof and which belt rail includes an upwardly presenting surface portion and has a plurality of horizontally opening apertures spaced therealong, said end fitting comprising an end fitting body sleeve having one end adapted for connection to one end of a crossbar body, a face plate extending transversely of said body sleeve and mounted on the other end thereof and extending downwardly from the upper side thereof, said face plate having a pair of parallel outwardly extending projections extending longitudinally of said body sleeve and disposed at the upper corners of said face plate, a hook member extending transversely of and mounted on said body sleeve at the bottom of said face plate, said hook member having a pair of laterally spaced hook portions adjacent the bottom of said end fitting, each including a hook end adapted to be received through one of said apertures and having a neck portion adapted to be received in the lower portion of one of said apertures, and a latch element mounted on said body sleeve for movement longitudinally thereof and having latch portions slidably engaging said neck portions and movable longitudinally thereof to and from an operative position in which said latch portions are received in the upper portions of the apertures in which said neck portions are received when said end fitting is attached to said belt rail so that said latch portions will engage said belt rail at said upper portions of said apertures to prevent sufficient upward movement of said end fitting to permit withdrawal of said hook ends through said apertures by movement of said end fitting at right angles to said belt rail, said neck portions and said latch portions having a sufficiently loose fit in said apertures so that upon lowering of said one end of said end fitting so that said end fitting pivots about the engagement of said neck portions with said belt rail at said lower portions of said apertures, said latch portions move out of said apertures.

8. An end fitting as defined in claim 7 wherein said face plate is substantially wider than twice the spacing of said apertures in said belt rail and said hook portions are laterally spaced a distance equal double the spacing of the apertures in the belt rail.

9. A crossbar for bracing freight in a boxcar or the like and adapted for connection between belt rails mounted on opposite side walls thereof and extending longitudinally thereof, each of which belt rails includes an upwardly presenting surface portion and has a plurality of horizontally opening apertures spaced therealong, said crossbar comprising a crossbar body, and end fitting mounted on one end of said crossbar body and adapted to be attached to one of said belt rails in selected adjusted positions longitudinally thereof, said end fitting including means on one end of said end fitting for connecting said end fitting to one end of said crossbar body, projection means on the other end of said end fitting adapted to extend longitudinally of said crossbar and in overlying relation to said upwardly presenting surface on said belt rail, hook means on said other end of said end fitting comprising at least one hook portion co-operable with at least one of said apertures and including a neck portion adapted to extend longitudinally of said crossbar and to be received in the lower portion of said one of said apertures and engage said belt rail at said lower portion of said one of said apertures, said hook portion also including a downwardly extending hook end outwardly of said neck portion adapted to be inserted through said one of said apertures and extend below said lower portion of one of said apertures when said neck portion is received therein, said end fitting including a latch portion adapted to be disposed in the upper portion of said one of said apertures when said hook end has been inserted therethrough and said neck portion moved into said lower portion so that said latch portion will engage said belt rail at said upper portion of said one of said apertures to prevent sufficient upward movement of said end fitting to permit withdrawal of said hook and through said aperture by movement of said end fitting at right angles to said belt rail, a second end fitting adapted to be attached to another of said belt rails in a corresponding selected adjusted position longitudinally thereof, and means mounting said second end fitting on the other end of said crossbar body for limited telescopic movement relative thereto, said neck portion and said latch portion having a sufficiently loose fit in said one of said apertures so that upon detachment of said second end fitting from said another of said belt rails and lowering of said another end of said crossbar body so that said first named end fitting pivots about the engagement of said neck portion with said one of said belt rails at said lower portion of said one of said apertures said latch portion moves out of said aperture.

References Cited by the Examiner
UNITED STATES PATENTS

| | | | |
|---|---|---|---|
| 2,425,875 | 8/1947 | Hermann | 105—369 |
| 2,576,425 | 11/1951 | Thearle | 105—369 |
| 2,659,319 | 11/1953 | Hermann | 105—369 |
| 2,963,992 | 12/1960 | Schroeder | 105—369 |
| 2,983,231 | 5/1961 | Henrikson. | |
| 3,114,335 | 12/1963 | Schroeder et al. | 105—369 |
| 3,114,336 | 12/1963 | Schroeder et al. | 105—369 |

ARTHUR L. LA POINT, *Primary Examiner.*

LEO QUACKENBUSH, *Examiner.*

D. E. HOFFMAN, *Assistant Examiner.*